(12) United States Patent
Chen (10) Patent No.: US 8,276,731 B2
(45) Date of Patent: *Oct. 2, 2012

(54) NORMALLY CLOSED SOUNDLESS BICYCLE HUB

(75) Inventor: Ching-Shu Chen, Changhua (TW)

(73) Assignee: Chosen Co., Ltd., Changhua Hsien (TW)

( * ) Notice: Subject to any disclaimer, the term of this patent is extended or adjusted under 35 U.S.C. 154(b) by 492 days.

This patent is subject to a terminal disclaimer.

(21) Appl. No.: 12/558,722

(22) Filed: Sep. 14, 2009

(65) Prior Publication Data

US 2011/0061490 A1    Mar. 17, 2011

(51) Int. Cl.
*F16D 41/30*    (2006.01)
(52) U.S. Cl. ............ 192/64; 192/46; 74/576; 301/110.5
(58) Field of Classification Search .............. 192/64
See application file for complete search history.

(56) References Cited

U.S. PATENT DOCUMENTS

| | | | | |
|---|---|---|---|---|
| 756,086 | A * | 3/1904 | Weiler | 192/46 |
| 6,155,394 | A * | 12/2000 | Shook | 192/46 |
| 6,202,813 | B1 * | 3/2001 | Yahata et al. | 192/64 |
| 7,938,241 | B1 * | 5/2011 | Chen | 192/64 |
| 7,938,242 | B2 * | 5/2011 | Chen | 192/64 |
| 2007/0289836 | A1 * | 12/2007 | Lin et al. | 192/64 |
| 2010/0252389 | A1 * | 10/2010 | French | 192/64 |
| 2011/0148183 | A1 * | 6/2011 | Chen | 301/110.5 |

FOREIGN PATENT DOCUMENTS

EP    0 195 172 A1 *    9/1986

* cited by examiner

*Primary Examiner* — Rodney Bonck
(74) *Attorney, Agent, or Firm* — Alan Kamrath; Kamrath IP Lawfirm, PA (57) ABSTRACT

A hub for a bicycle includes a shaft (12), a hub body (40), a ratchet wheel (43), a drive seat (10), a support ring (15), a rotation ring (21), a plurality of pawl members (22), a stop bushing (121), a limit ring (30) and a damper (33). Thus, when the drive seat is rotated backward by the pedal, each of the pawl members is retracted into the respective receiving slot (212) of the rotation ring to disengage the oneway ratchet teeth (42) of the ratchet wheel, so that each of the pawl members is spaced from and will not touch the ratchet wheel when the pedal is driven backward to prevent from producing a noise when the pedal is driven backward.

17 Claims, 10 Drawing Sheets

NORMALLY CLOSED SOUNDLESS BICYCLE HUB

BACKGROUND OF THE INVENTION

1. Field of the Invention

The present invention relates to a hub and, more particularly, to a ratchet hub for a bicycle.

2. Description of the Related Art

Figure 10:
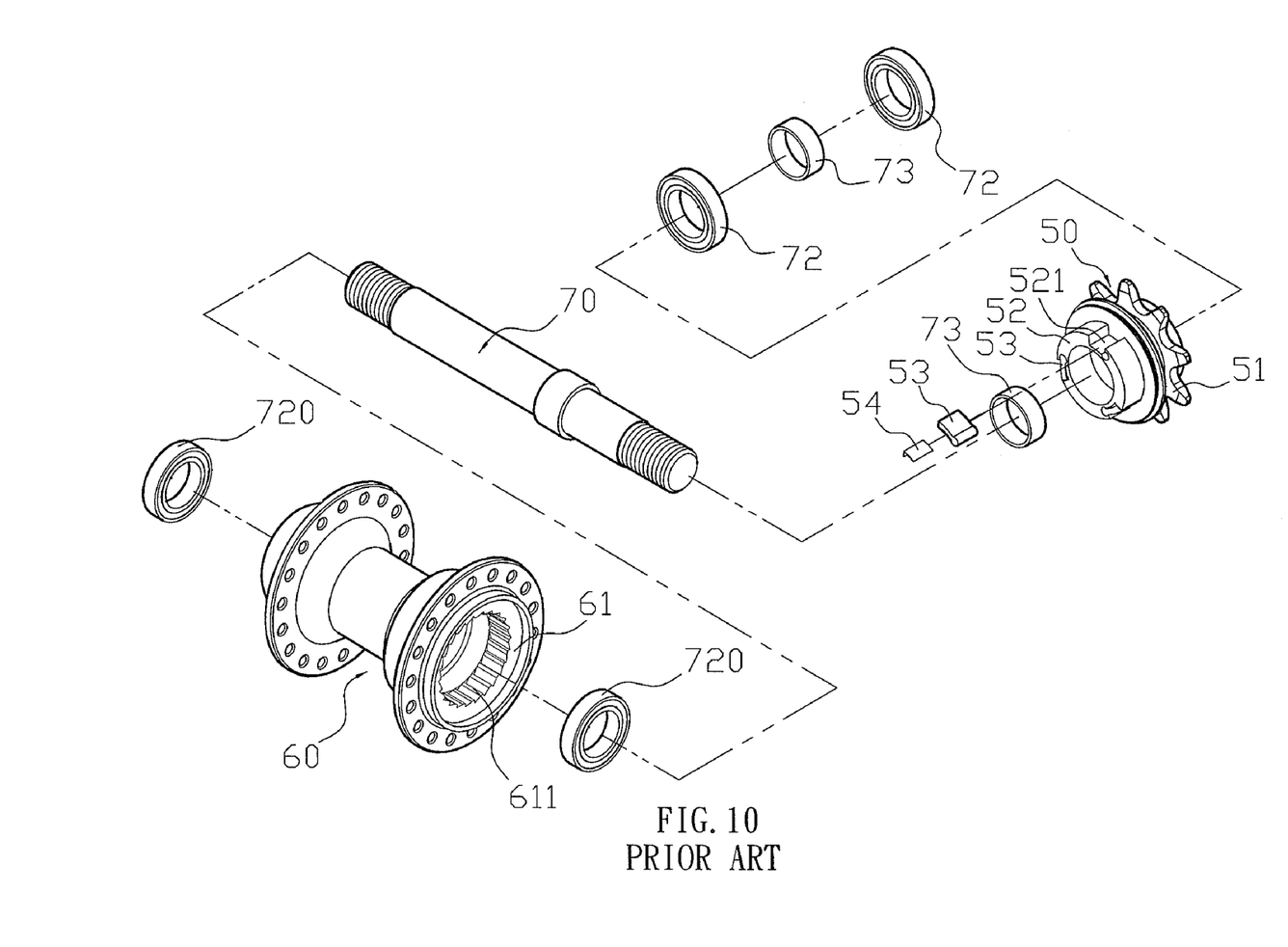
FIG. 10 is an exploded perspective view of a conventional hub for a bicycle in accordance with the prior art.
Figure 11:
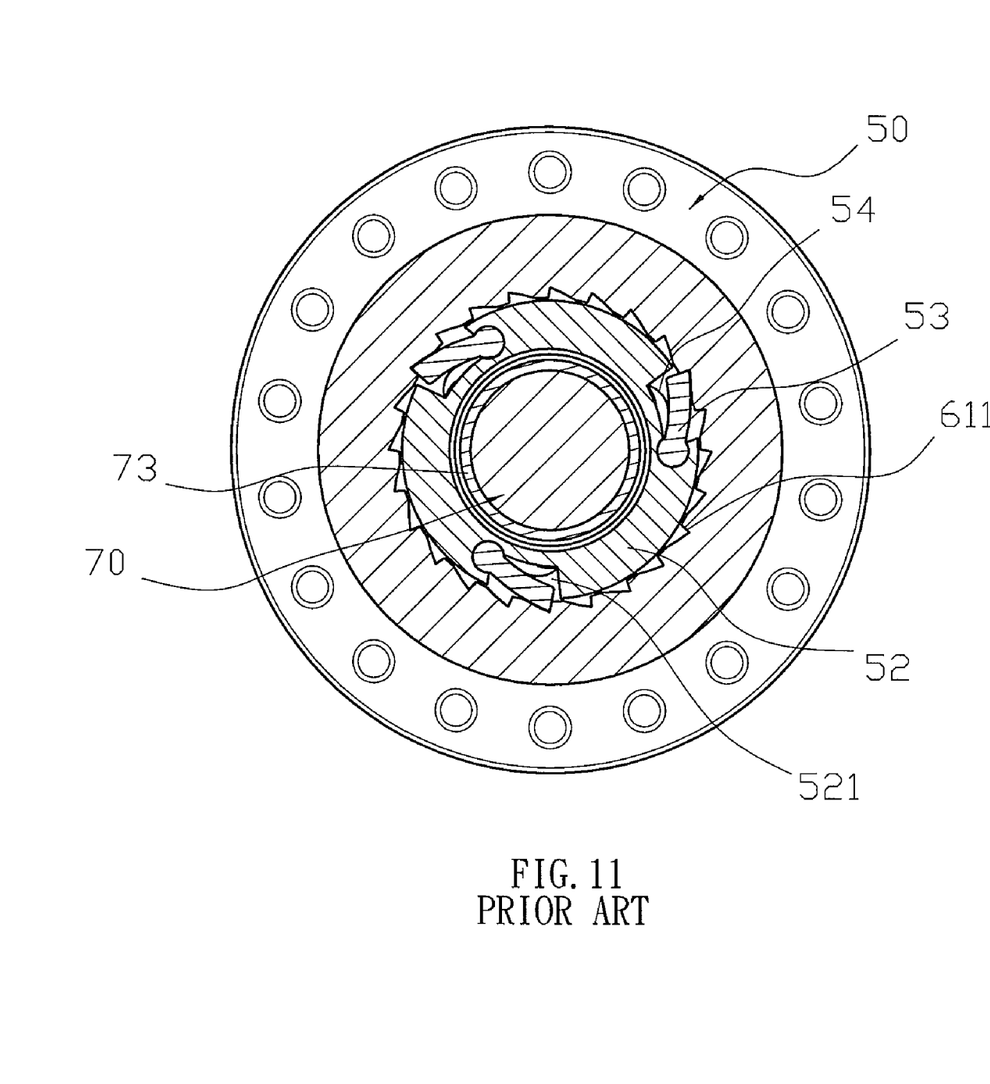
FIG. 11 is a side cross-sectional assembly view of the conventional hub for a bicycle as shown in FIG. 10.

A conventional hub for a bicycle in accordance with the prior art shown in FIGS. 10 and 11 comprises a shaft 70, a hub body 60 rotatably mounted on the shaft 70, a ratchet wheel 61 secured in the hub body 60 to drive the hub body 60 to rotate relative to the shaft 70 and having an inside provided with a plurality of oneway ratchet teeth 611, a drive seat 50 rotatably mounted on the shaft 70 and having a first end provided with a support base 52 which is rotatable in the ratchet wheel 61 and has a periphery provided with a plurality of receiving slots 521, a plurality of pawl members 53 each pivotally mounted in a respective one of the receiving slots 521 of the support base 52 and each meshing with the oneway ratchet teeth 611 of the ratchet wheel 61 so that the ratchet wheel 61 is combined with and rotatable with the support base 52 of the drive seat 50, a plurality of elastic members 54 each biased between the support base 52 of the drive seat 50 and a respective one of the pawl members 53, two first bearings 72 and two bushings 73 mounted between the drive seat 50 and the shaft 70, and two second bearings 720 mounted between the hub body 60 and the shaft 70. The drive seat 50 has a second end provided with a sprocket 51.

In assembly, the hub body 60 is connected to a wheel (not shown) of the bicycle, and the shaft 70 is connected to a frame (not shown) of the bicycle. The sprocket 51 of the drive seat 50 meshes with and is driven by a chain (not shown) which is driven by a chainwheel (not shown) which is driven by a pedal (not shown) that is pedalled by a rider.

In operation, when the pedal is pedalled by the rider to move forward, the chainwheel is driven by the pedal to drive the chain which drives the sprocket 51 of the drive seat 50 to rotate the drive seat 50 forward relative to the shaft 70, so that each of the pawl members 53 is rotatable forward with the support base 52 of the drive seat 50. At this time, each of the pawl members 53 meshes with the oneway ratchet teeth 611 of the ratchet wheel 61 so that the ratchet wheel 61 is driven by the pawl members 53 to drive the hub body 60 to rotate relative to the shaft 70 to move the wheel forward. On the contrary, when the pedal is pedalled by the rider to move backward, the chainwheel is driven by the pedal to drive the chain which drives the sprocket 51 of the drive seat 50 to rotate the drive seat 50 backward relative to the shaft 70, so that each of the pawl members 53 is rotatable backward with the support base 52 of the drive seat 50. At this time, each of the pawl members 53 passes by the oneway ratchet teeth 611 of the ratchet wheel 61 so that the ratchet wheel 61 is released from the oneway ratchet teeth 611 of the ratchet wheel 61. Thus, the ratchet wheel 61 together with the hub body 60 is not driven by the drive seat 50, and the drive seat 50 idles in the backward direction.

However, when each of the pawl members 53 passes by the oneway ratchet teeth 611 of the ratchet wheel 61 during the backward rotation of the drive seat 50, each of the pawl members 53 touches the oneway ratchet teeth 611 of the ratchet wheel 61 to produce noise due to the friction, thereby easily causing an uncomfortable sensation to the rider. In addition, when the hub body 60 is rotated in the backward direction (e.g., when the wheel is rotated backward), the ratchet wheel 61 is also rotated in the backward direction. At this time, each of the pawl members 53 meshes with the oneway ratchet teeth 611 of the ratchet wheel 61 so that the ratchet wheel 61 drives each of the pawl members 53 to drive the drive seat 50 to rotate relative to the shaft 70 in the backward direction. Thus, the pedal is driven by the drive seat 50 to rotate backward so that the rider is easily hit and hurt by the pedal, thereby causing danger to the rider.

BRIEF SUMMARY OF THE INVENTION

In accordance with the present invention, there is provided a hub for a bicycle, comprising a shaft, a hub body rotatably mounted on the shaft, a ratchet wheel secured in the hub body to drive the hub body to rotate relative to the shaft and having an inner wall provided with a plurality of oneway ratchet teeth, a drive seat rotatably mounted on the shaft and having an end face provided with a plurality of drive blocks each having a surface provided with an oblique driving slot, a support ring secured on the drive seat and protruding from the drive blocks, a rotation ring mounted on the support ring and having a periphery provided with a plurality of receiving slots, a plurality of pawl members each pivotally mounted in a respective one of the receiving slots of the rotation ring to releasably mesh with the oneway ratchet teeth of the ratchet wheel and each having a side provided with a guide post which is movable in the driving slot of a respective one of the drive blocks, a stop bushing mounted on the shaft, a limit ring mounted on the stop bushing and attached to the rotation ring to rotate in concert with the rotation ring and a damper mounted on the stop bushing and pressing the limit ring to damp a rotation movement of the rotation ring.

The primary objective of the present invention is to provide a normally closed bicycle hub that will not drive the pedal and will not produce noise when the hub is rotated in the backward direction.

According to the primary objective of the present invention, when the drive seat is rotated backward by the pedal, each of the pawl members is retracted into the respective receiving slot of the rotation ring to disengage the oneway ratchet teeth of the ratchet wheel, so that each of the pawl members is spaced from and will not touch the ratchet wheel when the pedal is driven backward to prevent from producing a noise when the pedal is driven backward.

According to another objective of the present invention, each of the pawl members is separated from the ratchet wheel when the pedal is driven backward so that the hub body is separated from the drive seat, and a backward rotation of the hub body will not drive the drive seat and the pedal to prevent the pedal from being driven backward when the hub body is rotated backward and to protect a rider's safety.

Further benefits and advantages of the present invention will become apparent after a careful reading of the detailed description with appropriate reference to the accompanying drawings.

DETAILED DESCRIPTION OF THE INVENTION

Referring to the drawings and initially to FIGS. 1-7, a hub for a bicycle in accordance with the preferred embodiment of the present invention comprises a shaft 12, a hub body 40 rotatably mounted on the shaft 12, a ratchet wheel 43 secured in the hub body 40 to drive the hub body 40 to rotate relative to the shaft 12 and having an inner wall provided with a plurality of oneway ratchet teeth 42, a drive seat 10 rotatably mounted on the shaft 12 and having an end face provided with a plurality of drive blocks 13 each having a surface provided with an oblique driving slot 14, a support ring 15 secured on the drive seat 10 and protruding from the drive blocks 13, a rotation ring 21 mounted on the support ring 15 and having a periphery provided with a plurality of receiving slots 212, a plurality of pawl members 22 each pivotally mounted in a respective one of the receiving slots 212 of the rotation ring 21 to releasably mesh with the oneway ratchet teeth 42 of the ratchet wheel 43 and each having a side provided with a guide post 222 which is movable in the driving slot 14 of a respective one of the drive blocks 13, a stop bushing 121 mounted on the shaft 12, a limit ring 30 mounted on the stop bushing 121 and attached to the rotation ring 21 to rotate in concert with the rotation ring 21, and a damper 33 mounted on the stop bushing 121 and pressing the limit ring 30 to damp a rotation movement of the rotation ring 21. The hub further comprises an elastic member 23 mounted on the rotation ring 21 and pressing each of the pawl members 22 to detach each of the pawl members 22 from the oneway ratchet teeth 42 of the ratchet wheel 43 at a normal state.

The drive seat 10 has an inner portion provided with a stepped shaft hole 11 rotatably mounted on the shaft 12 by at least one bearing 101. The end face of the drive seat 10 is provided with a plurality of elongate limit grooves 131 located between the drive blocks 13 respectively. The drive seat 10 has an annular outer surface provided with a plurality of axially extending fixing channels 16 for mounting at least one sprocket (not shown). The driving slot 14 of each of the drive blocks 13 has an outer side 142 and an inner side 141. The inner side 141 is located between the outer side 142 and the shaft 12, and the outer side 142 is located between the inner side 141 and the oneway ratchet teeth 42 of the ratchet wheel 43.

Figure 4:
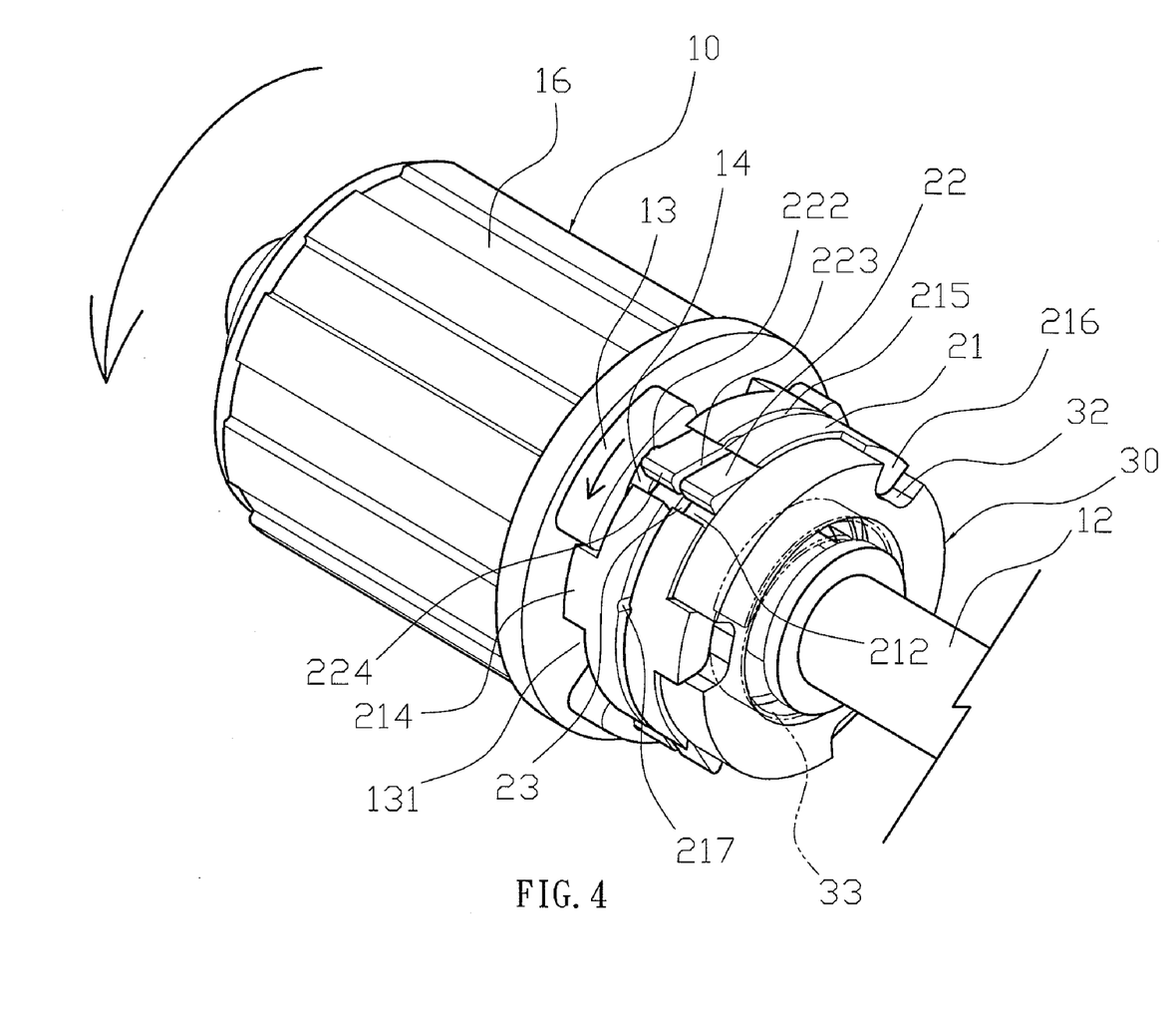
FIG. 4 is a partial perspective view of the hub for a bicycle as shown in FIG. 1.
Figure 5:
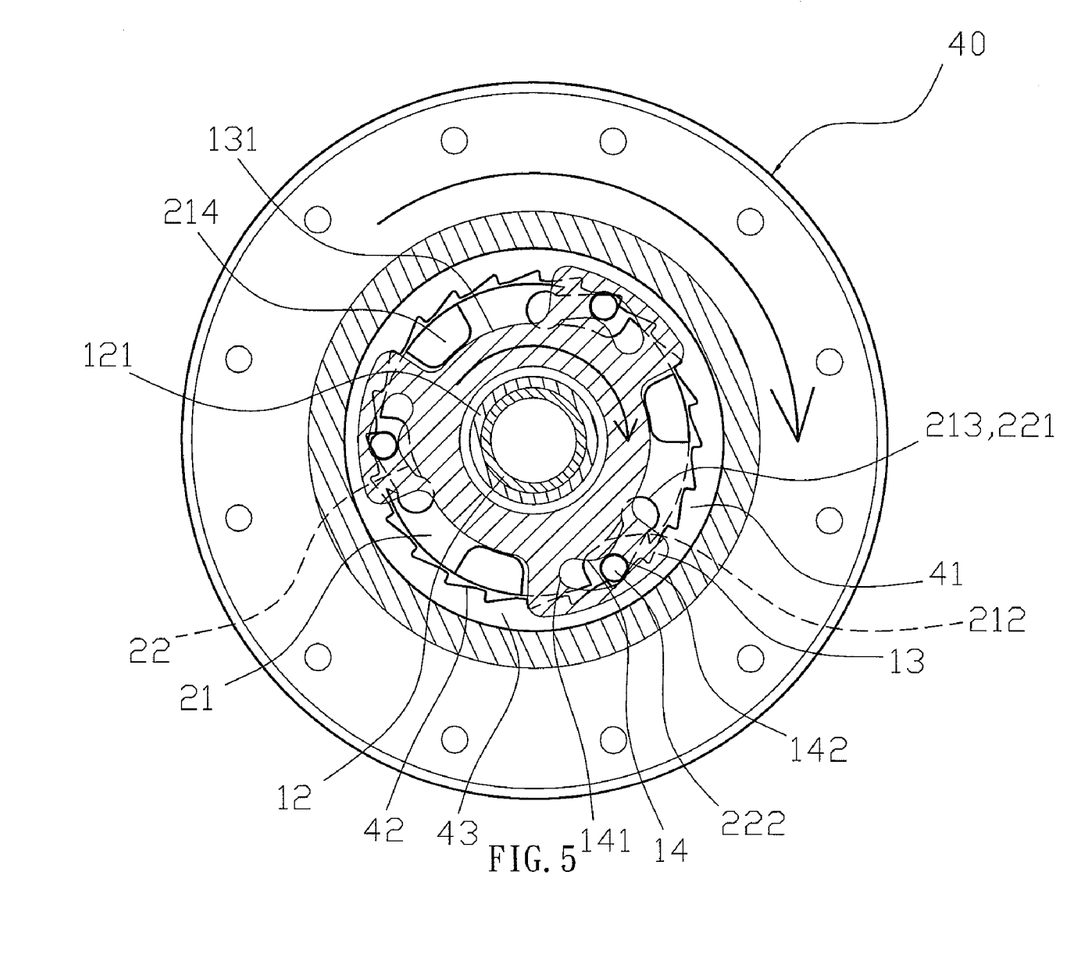
FIG. 5 is a side cross-sectional view of the hub for a bicycle taken along line 5-5 as shown in FIG. 3.
Figure 6:
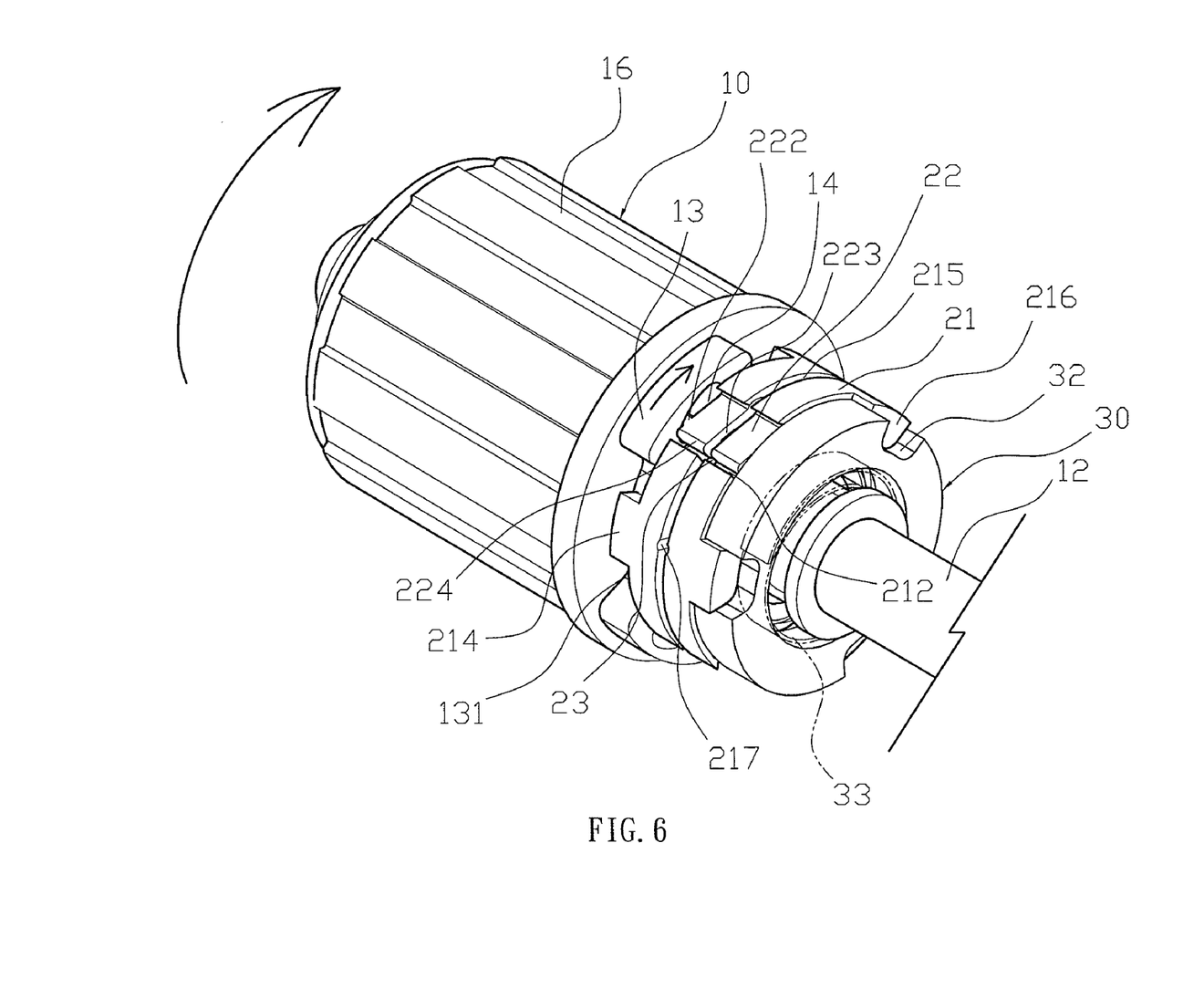
FIG. 6 is a schematic operational view of the hub for a bicycle as shown in FIG. 4.
Figure 7:
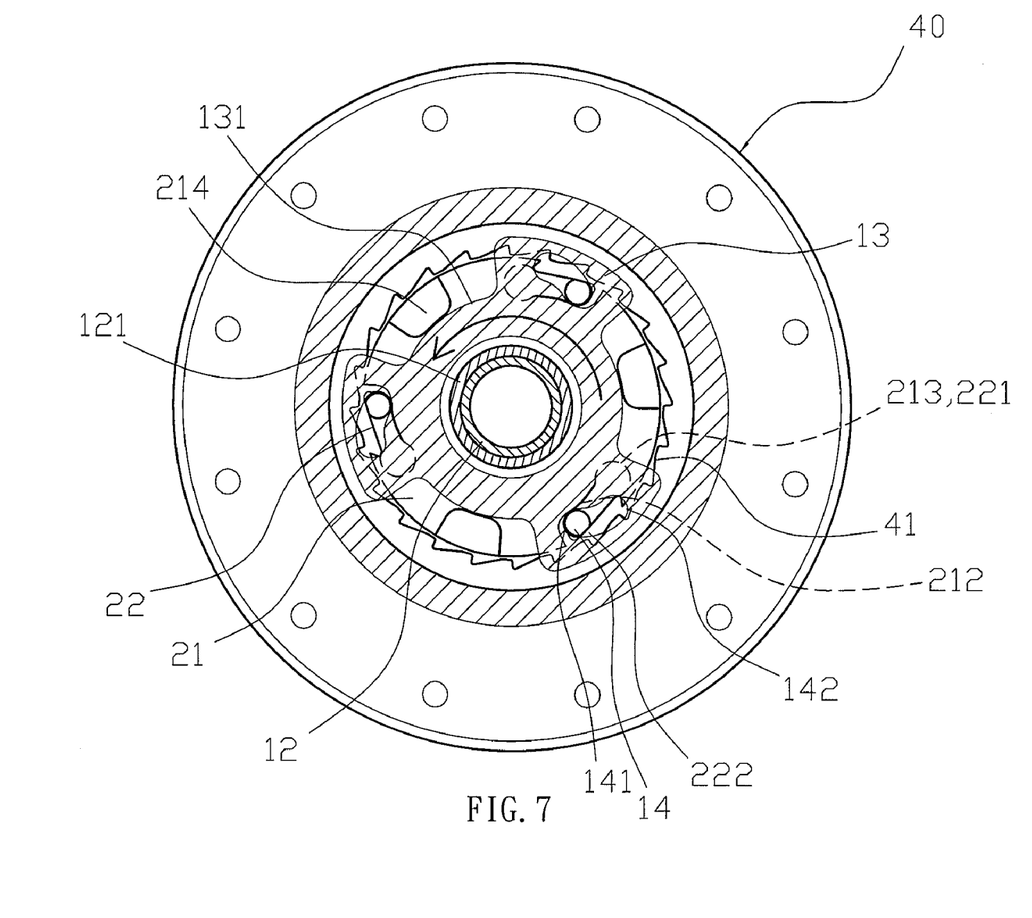
FIG. 7 is a schematic operational view of the hub for a bicycle as shown in FIG. 5.

Thus, the drive seat 10 is rotatable between a first position as shown in FIGS. 4 and 5 where the guide post 222 of each of the pawl members 22 is movable to the outer side 142 of the driving slot 14 of the respective drive block 13 so that each of the pawl members 22 meshes with the oneway ratchet teeth 42 of the ratchet wheel 43 and a second position as shown in FIGS. 6 and 7 where the guide post 222 of each of the pawl members 22 is movable to the inner side 141 of the driving slot 14 of the respective drive block 13 so that each of the pawl members 22 is disengaged from the oneway ratchet teeth 42 of the ratchet wheel 43.

The rotation ring 21 has an inner portion provided with a through hole 211 rotatably mounted on the support ring 15. Each of the receiving slots 212 of the rotation ring 21 has an oblique shape and has an end provided with a pivot hole 213. The rotation ring 21 is provided with a plurality of positioning pieces 216 directed toward the limit ring 30. The rotation ring 21 is provided with a plurality of limit ribs 214 movable in the limit grooves 131 of the drive seat 10 respectively and limited between the drive blocks 13 of the drive seat 10 respectively. The rotation ring 21 has an outer surface provided with an annular retaining groove 215 to retain the elastic member 23. The retaining groove 215 of the rotation ring 21 has a bottom wall provided with a fixing hole 217.

Each of the pawl members 22 has a first end provided with an enlarged pivot fulcrum 221 pivotally mounted in the pivot hole 213 of the respective receiving slot 212 of the rotation ring 21 and a second end provided with a locking detent 224 which is movable with the guide post 222 to mesh with or detach from the oneway ratchet teeth 42 of the ratchet wheel 43. The second end of each of the pawl members 22 is provided with the guide post 222. Each of the pawl members 22 has an outer surface provided with an elongate limit groove 223 to receive the elastic member 23.

The elastic member 23 has a substantially C-shaped profile and has a side provided with an opening 231. The elastic member 23 has an end provided with a bent fixing portion 232 inserted into the fixing hole 217 of the rotation ring 21 to fix the elastic member 23 onto the rotation ring 21.

The limit ring 30 has an inner portion provided with a stepped receiving hole 31 mounted on the stop bushing 121 to receive the damper 33. The limit ring 30 abuts the rotation ring 21 and has a periphery provided with a plurality of positioning recesses 32 to fix the positioning pieces 216 of the rotation ring 21 so that the limit ring 30 is rotatable in concert with the rotation ring 21. The limit ring 30 is located between the support ring 15 and the stop bushing 121.

The damper 33 is secured in the receiving hole 31 of the limit ring 30 and is located between the limit ring 30 and the stop bushing 121. The damper 33 is made of a resilient material and has an inner wall 330 closely fit onto the stop bushing 121 and an outer wall 332 pressing the limit ring 30 to provide a damping force to a rotation movement of the limit ring 30.

The hub body 40 has an inner portion provided with a stepped receiving space 41 rotatably mounted on the shaft 12 by a bearing 401. The receiving space 41 of the hub body 40 receives the drive blocks 13 of the drive seat 10, the rotation ring 21, the limit ring 30 and the stop bushing 121. The ratchet wheel 43 is secured in the receiving space 41 of the hub body 40 and surrounds the rotation ring 21 and the pawl members 22.

The stop bushing 121 is inserted into the shaft hole 11 of the drive seat 10. The stop bushing 121 is located between the bearing 101 of the drive seat 10 and the bearing 401 of the hub body 40 so that the stop bushing 121 is located between the drive seat 10 and the hub body 40.

In assembly, the hub body 40 is connected to a wheel (not shown) of the bicycle, the shaft 12 is connected to a frame (not shown) of the bicycle, and the sprocket on the drive seat 10 meshes with and is driven by a chain (not shown) which is driven by a chainwheel (not shown) which is driven by a pedal (not shown) that is pedalled by a rider. Thus, each of the pawl members 22 is initially pressed inward by the elastic member 23 to disengage the one-way ratchet teeth 42 of the ratchet wheel 43, so that the ratchet wheel 43 is released from and non-rotatable with the drive seat 10 at a normal state. At this time, the guide post 222 of each of the pawl members 22 is located at the inner side 141 of the driving slot 14 of the respective drive block 13 as shown in FIG. 7.

Figure 1:
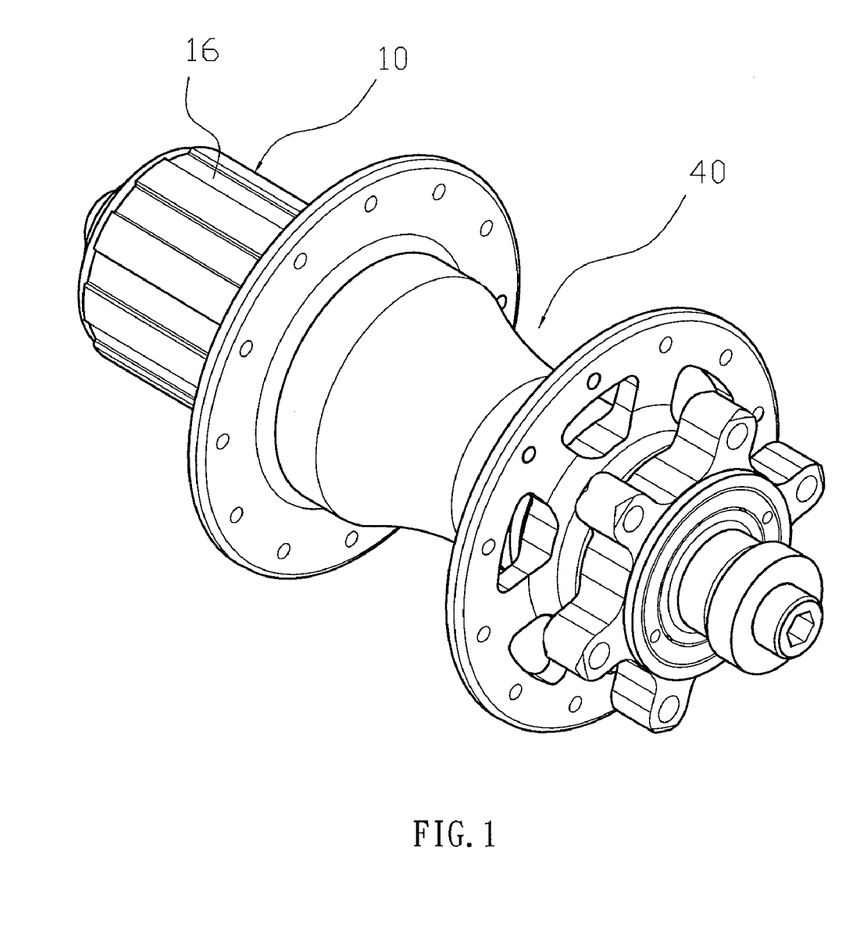
FIG. 1 is a perspective view of a hub for a bicycle in accordance with the preferred embodiment of the present invention.
Figure 2:
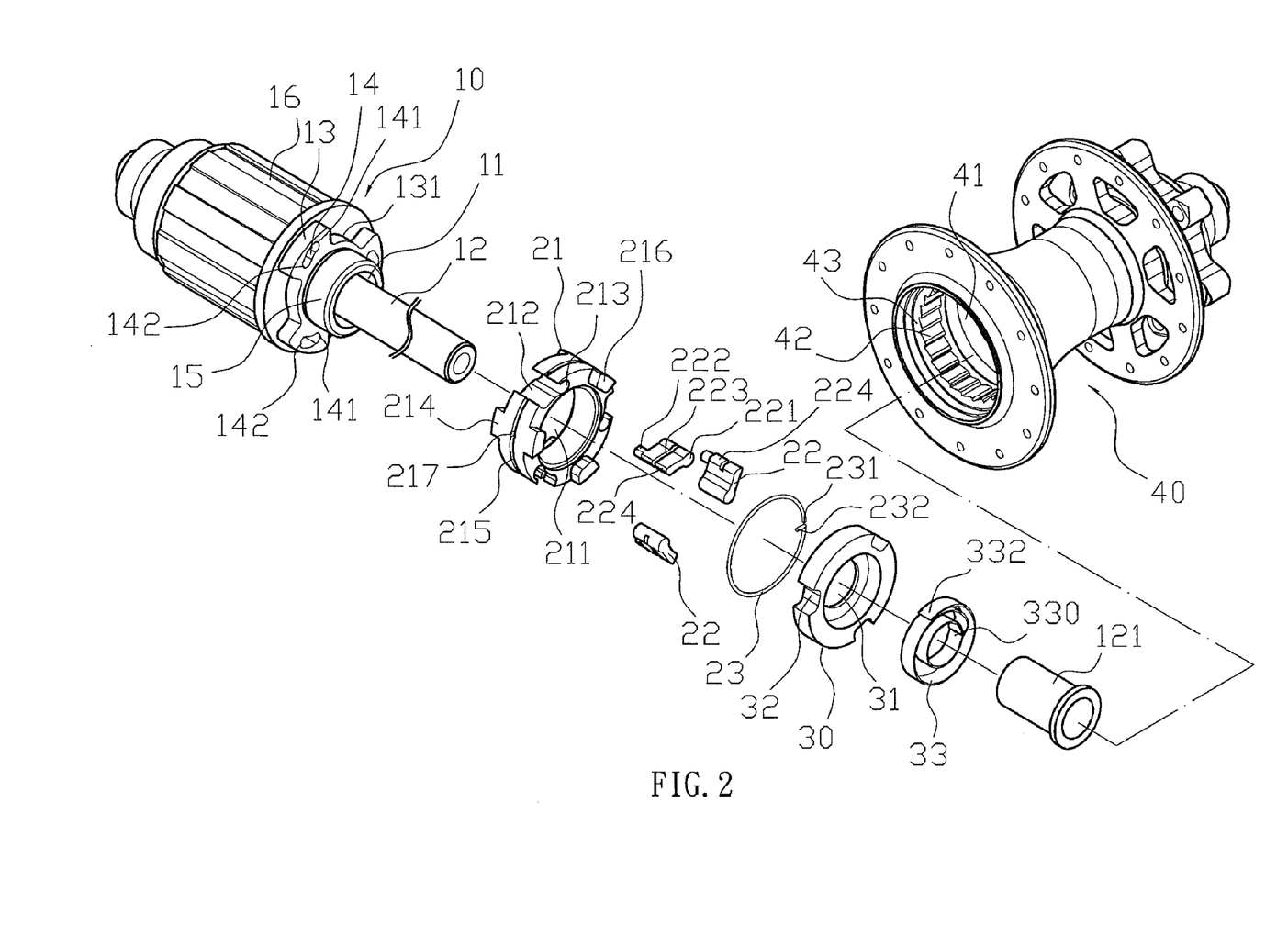
FIG. 2 is an exploded perspective view of the hub for a bicycle as shown in FIG. 1.
Figure 3:
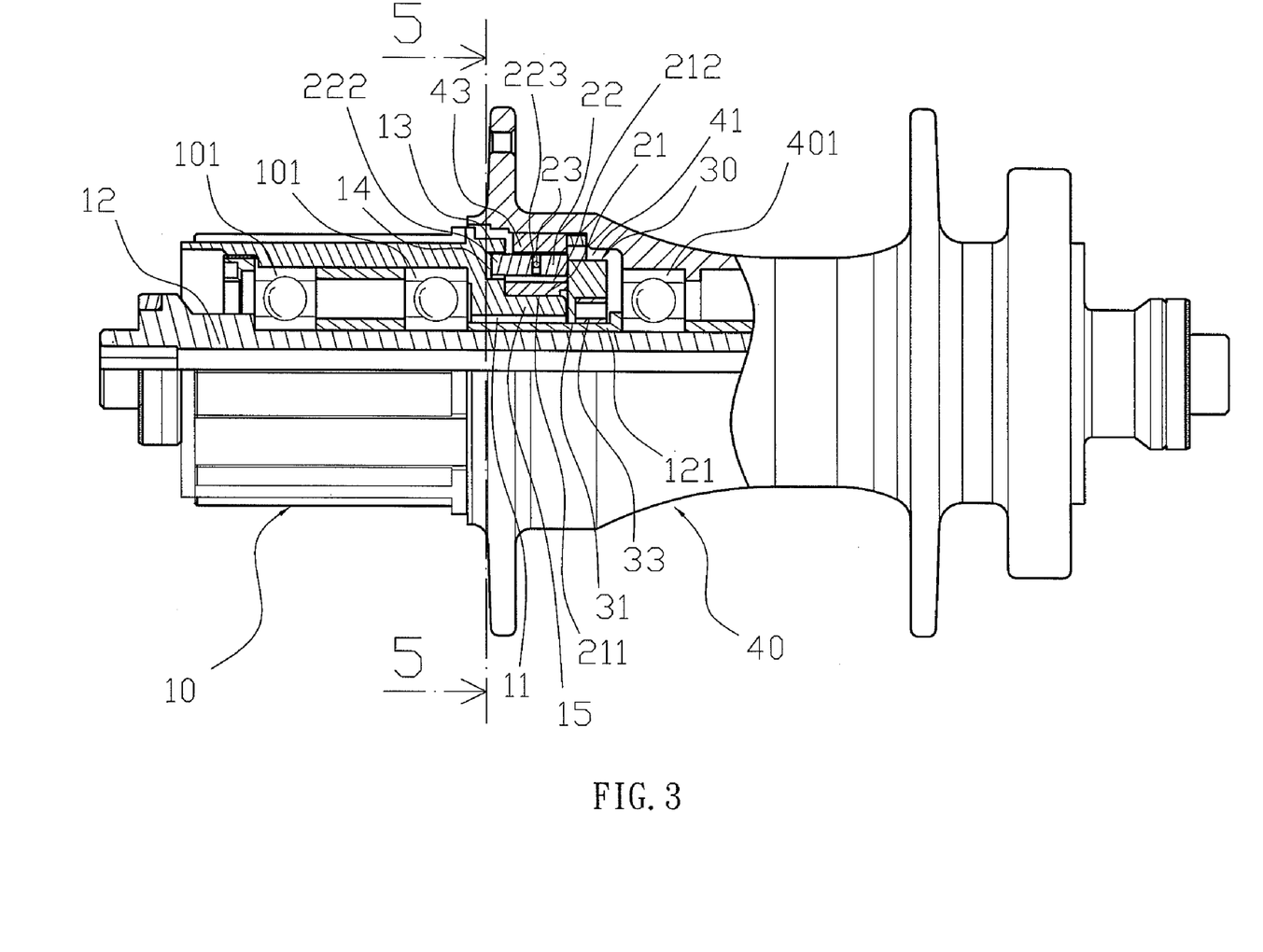
FIG. 3 is a partial front cross-sectional view of the hub for a bicycle as shown in FIG. 1.

In operation, referring to FIGS. 4-7 with reference to FIGS. 1-3, when the pedal is pedalled by the rider, the chainwheel is driven by the pedal to drive the chain which drives the sprocket of the drive seat 10 to rotate the drive seat 10 forward. Thus, the drive seat 10 is rotated forward relative to the shaft 12, and the drive blocks 13 of the drive seat 10 are also rotated forward relative to the shaft 12 as shown in FIG. 4. At this time, the damper 33 provides a damping force to the rotation movement of the limit ring 30 so that the rotation ring 21 and the limit ring 30 will not be rotated with the drive blocks 13 of the drive seat 10. In such a manner, when the drive blocks 13 of the drive seat 10 are rotated forward relative to the shaft 12, the guide post 222 of each of the pawl members 22 is moved from the inner side 141 to the outer side 142 of the driving slot 14 of the respective drive block 13 as shown in FIG. 5, and each of the pawl members 22 is pivoted outwardly relative to the respective receiving slot 212 of the rotation ring 21 as shown in FIG. 4. Therefore, the locking detent 224 of each of the pawl members 22 is also moved outwardly to mesh with the oneway ratchet teeth 42 of the ratchet wheel 43. Thus, the ratchet wheel 43 is combined with the rotation ring 21 and the drive blocks 13 of the drive seat 10 by the pawl members 22, so that when the drive seat 10 is rotated forward relative to the shaft 12, the ratchet wheel 43 is driven by the drive seat 10 to drive the hub body 40 to rotate forward relative to the shaft 12 to move the wheel forward.

On the contrary, when the pedal is pedalled by the rider to move backward, the chainwheel is driven by the pedal to drive the chain which drives the sprocket of the drive seat 10 to rotate the drive seat 10 backward relative to the shaft 12. Thus, the drive seat 10 is rotated backward relative to the shaft 12, and the drive blocks 13 of the drive seat 10 are also rotated backward relative to the shaft 12 as shown in FIG. 6. At this time, the damper 33 provides a damping force to the rotation movement of the limit ring 30 so that the rotation ring 21 and the limit ring 30 will not be rotated with the drive blocks 13 of the drive seat 10. In such a manner, when the drive blocks 13 of the drive seat 10 are rotated backward relative to the shaft 12, the guide post 222 of each of the pawl members 22 is moved from the outer side 142 to the inner side 141 of the driving slot 14 of the respective drive block 13 as shown in FIG. 7, and each of the pawl members 22 is pivoted inwardly to retract into the respective receiving slot 212 of the rotation ring 21 as shown in FIG. 6. Therefore, the locking detent 224 of each of the pawl members 22 is also moved inwardly to disengage the oneway ratchet teeth 42 of the ratchet wheel 43. Thus, the ratchet wheel 43 is released from the rotation ring 21 and the drive blocks 13 of the drive seat 10 by the pawl members 22, so that when the drive seat 10 is rotated backward relative to the shaft 12, the ratchet wheel 43 together with the hub body 40 is not driven by the drive seat 10, and the drive seat 10 idles.

Thus, when the drive seat 10 is rotated backward by the pedal, each of the pawl members 22 is retracted into the respective receiving slot 212 of the rotation ring 21, and the locking detent 224 of each of the pawl members 22 disengages the oneway ratchet teeth 42 of the ratchet wheel 43 constantly. Thus, each of the pawl members 22 will not touch the ratchet wheel 43 when the pedal is driven backward to prevent from producing a noise when the pedal is driven backward. In addition, each of the pawl members 22 is separated from the ratchet wheel 43 when the pedal is driven backward so that the hub body 40 is separated from the drive seat 10, and a backward rotation of the hub body 40 will not drive the drive seat 10 and the pedal to prevent the pedal from being driven when the hub body 40 is rotated backward.

Figure 8:
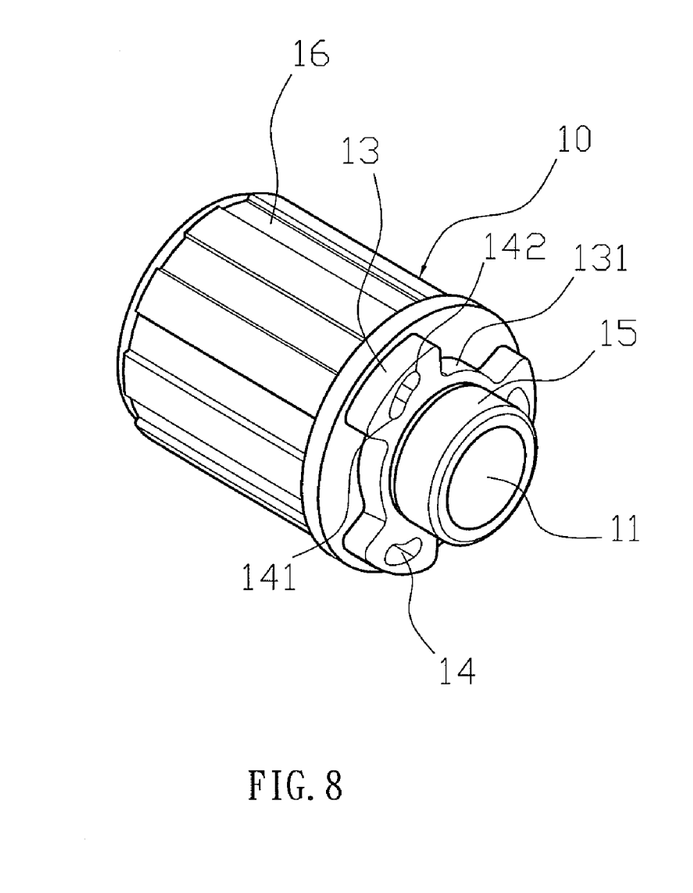
FIG. 8 is a locally enlarged view of a drive seat of the hub for a bicycle as shown in FIG. 2.

Referring to FIG. 8, the drive seat 10 has an annular outer surface provided with a plurality of axially extending fixing channels 16 for mounting a plurality of sprockets.

Figure 9:
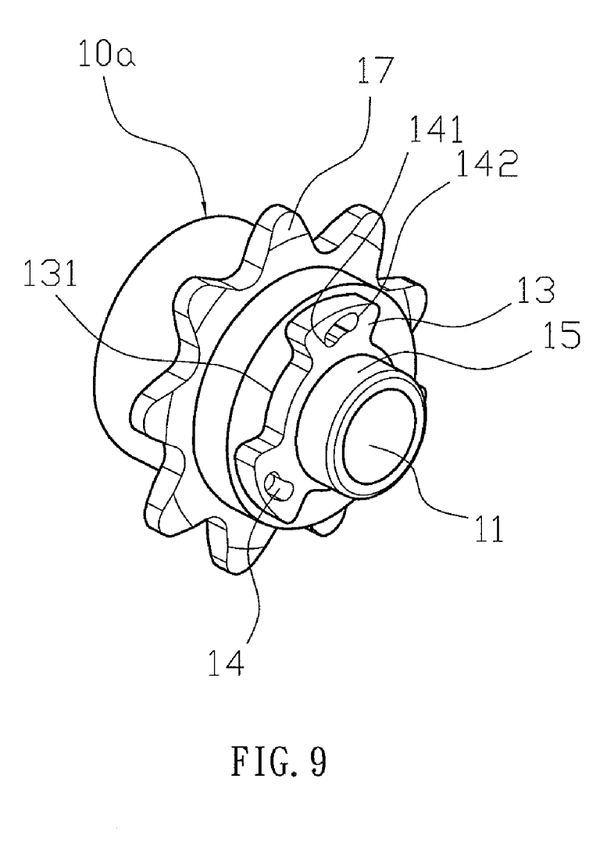
FIG. 9 is a locally enlarged view of a drive seat of the hub for a bicycle in accordance with another preferred embodiment of the present invention.

Referring to FIG. 9, a single sprocket 17 is integrally formed on the drive seat 10*a*.

Accordingly, when the drive seat 10 is rotated backward by the pedal, each of the pawl members 22 is retracted into the respective receiving slot 212 of the rotation ring 21 to disengage the oneway ratchet teeth 42 of the ratchet wheel 43. Thus, each of the pawl members 22 is spaced from and will not touch the ratchet wheel 43 when the pedal is driven backward to prevent from producing a noise when the pedal is driven backward. In addition, each of the pawl members 22 is separated from the ratchet wheel 43 when the pedal is driven backward so that the hub body 40 is separated from the drive seat 10, and a backward rotation of the hub body 40 will not drive the drive seat 10 and the pedal to prevent the pedal from being driven backward when the hub body 40 is rotated backward and to protect a rider's safety.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A hub for a bicycle, comprising:
a shaft;
a hub body rotatably mounted on the shaft;
a ratchet wheel secured in the hub body to drive the hub body to rotate relative to the shaft and having an inner wall provided with a plurality of oneway ratchet teeth;
a drive seat rotatably mounted on the shaft and having an end face provided with a plurality of drive blocks each having a surface provided with an oblique driving slot;
a support ring secured on the drive seat and protruding from the drive blocks;
a rotation ring mounted on the support ring and having a periphery provided with a plurality of receiving slots;
a plurality of pawl members each pivotally mounted in a respective one of the plurality of receiving slots of the rotation ring to releasably mesh with the oneway ratchet teeth of the ratchet wheel and each having a side provided with a guide post which is movable in the driving slot of a respective one of the plurality of drive blocks;
a stop bushing mounted on the shaft;
a limit ring mounted on the stop bushing and attached to the rotation ring to rotate in concert with the rotation ring; and
a damper mounted on the stop bushing and pressing the limit ring to damp a rotation movement of the rotation ring.

2. The hub for a bicycle of claim 1, wherein
the drive seat has an inner portion provided with a stepped shaft hole rotatably mounted on the shaft by at least one bearing;
the driving slot of each of the drive blocks has an outer side and an inner side;
the rotation ring has an inner portion provided with a through hole rotatably mounted on the support ring;
each of the plurality of receiving slots of the rotation ring has an end provided with a pivot hole;

each of the plurality of pawl members has a first end provided with an enlarged pivot fulcrum pivotally mounted in the pivot hole of the respective receiving slot of the rotation ring and a second end provided with the guide post;

the rotation ring is provided with a plurality of positioning pieces directed toward the limit ring;

the limit ring has an inner portion provided with a stepped receiving hole mounted on the stop bushing to receive the damper;

the limit ring abuts the rotation ring and has a periphery provided with a plurality of positioning recesses to fix the plurality of positioning pieces of the rotation ring so that the limit ring is rotatable in concert with the rotation ring; and the hub body has an inner portion provided with a stepped receiving space rotatably mounted on the shaft by a bearing.

3. The hub for a bicycle of claim 2, wherein the damper is secured in the receiving hole of the limit ring and is located between the limit ring and the stop bushing; and the damper is made of a resilient material and has an inner wall closely fit onto the stop bushing and an outer wall pressing the limit ring to provide a damping force to a rotation movement of the limit ring.

4. The hub for a bicycle of claim 2, wherein the receiving space of the hub body receives the plurality of drive blocks of the drive seat, the rotation ring, the limit ring and the stop bushing; and the ratchet wheel is secured in the receiving space of the hub body and surrounds the rotation ring and the plurality of pawl members.

5. The hub for a bicycle of claim 2, wherein the stop bushing is located between the bearing of the drive seat and the bearing of the hub body.

6. The hub for a bicycle of claim 5, wherein the stop bushing is located between the drive seat and the hub body.

7. The hub for a bicycle of claim 2, wherein the inner side is located between the outer side and the shaft;

the outer side is located between the inner side and the oneway ratchet teeth of the ratchet wheel; and the drive seat is rotatable between a first position where the guide post of each of the plurality of pawl members is movable to the outer side of the driving slot of the respective drive block so that each of the plurality of pawl members meshes with the oneway ratchet teeth of the ratchet wheel and a second position where the guide post of each of the plurality of pawl members is movable to the inner side of the driving slot of the respective drive block so that each of the plurality of pawl members is disengaged from the oneway ratchet teeth of the ratchet wheel.

8. The hub for a bicycle of claim 2, wherein the stop bushing is inserted into the shaft hole of the drive seat.

9. The hub for a bicycle of claim 2, wherein the second end of each of the plurality of pawl members is provided with a locking detent which is movable with the guide post to mesh with or detach from the oneway ratchet teeth of the ratchet wheel.

10. The hub for a bicycle of claim 1, wherein the end face of the drive seat is provided with a plurality of elongate limit grooves located between the plurality of drive blocks respectively; and the rotation ring is provided with a plurality of limit ribs movable in the plurality of elongate limit grooves of the drive seat respectively and limited between the plurality of drive blocks of the drive seat respectively.

11. The hub for a bicycle of claim 1, further comprising:

an elastic member mounted on the rotation ring and pressing each of the plurality of pawl members to detach each of the plurality of pawl members from the oneway ratchet teeth of the ratchet wheel at a normal state.

12. The hub for a bicycle of claim 11, wherein the rotation ring has an outer surface provided with an annular retaining groove to retain the elastic member; and each of the plurality of pawl members has an outer surface provided with an elongate limit groove to receive the elastic member.

13. The hub for a bicycle of claim 12, wherein the retaining groove of the rotation ring has a bottom wall provided with a fixing hole;

the elastic member has a substantially C-shaped profile and has a side provided with an opening; and the elastic member has an end provided with a bent fixing portion inserted into the fixing hole of the rotation ring to fix the elastic member onto the rotation ring.

14. The hub for a bicycle of claim 1, wherein the drive seat has an annular outer surface provided with a plurality of axially extending fixing channels for mounting at least one sprocket.

15. The hub for a bicycle of claim 1, wherein the drive seat has an outer surface integrally formed with a single sprocket.

16. The hub for a bicycle of claim 1, wherein each of the plurality of receiving slots of the rotation ring has an oblique shape.

17. The hub for a bicycle of claim 1, wherein the limit ring is located between the support ring and the stop bushing.

* * * * *